United States Patent [19]

Trousset et al.

[11] Patent Number: 5,095,521
[45] Date of Patent: Mar. 10, 1992

[54] METHOD FOR THE COMPUTING AND IMAGING OF VIEWS OF AN OBJECT

[75] Inventors: Yves Trousset; Francis Schmitt, both of Paris, France

[73] Assignee: General Electric CGR S.A., Issy les Moulineaux, France

[21] Appl. No.: 488,458

[22] Filed: Feb. 27, 1990

Related U.S. Application Data

[63] Continuation of Ser. No. 177,458, Apr. 1, 1988, abandoned.

[30] Foreign Application Priority Data

Apr. 3, 1987 [FR] France ................................ 87 04728

[51] Int. Cl.$^5$ ............................................... G06F 15/72
[52] U.S. Cl. ............................................ 395/121; 395/124
[58] Field of Search ............. 364/522, 413.13, 413.16, 364/413.18, 413.19, 413.22; 378/901

[56] References Cited

U.S. PATENT DOCUMENTS

| | | | |
|---|---|---|---|
| 3,602,702 | 8/1971 | Warnock | 364/522 |
| 3,621,214 | 11/1977 | Romney et al. | 364/522 |
| 4,710,876 | 12/1987 | Cline et al. | 364/413.22 |
| 4,719,585 | 1/1988 | Cline et al. | 364/522 X |
| 4,729,098 | 3/1988 | Cline et al. | 364/413.18 |
| 4,751,643 | 6/1988 | Lorensen et al. | 364/413.13 |
| 4,791,567 | 12/1988 | Cline et al. | 364/413.13 |
| 4,821,210 | 4/1989 | Rumbaugh | 364/522 X |
| 4,821,213 | 4/1989 | Cline et al. | 364/522 |
| 4,835,712 | 5/1989 | Drebin et al. | 364/518 |
| 4,952,922 | 8/1990 | Griffin et al. | 364/522 X |

*Primary Examiner*—Gary V. Harkcom
*Assistant Examiner*—Mark K. Zimmerman
*Attorney, Agent, or Firm*—Oblon, Spivak, McClelland, Maier & Neustadt

[57] ABSTRACT

With a digital volume of data representing a nondestructive investigation conducted on a body, an operation is made for the segmentation of objects contained in this digital volume, as well as an operation to display a view of this object from a given viewpoint. To perform the segmentation, the digital volume is explored according to a mode of exploration by which a parameter is assigned to each volume element, of the volume under examination, which belongs to the segmented object. Subsequently, by acting on this parameter, it is possible to modify the segmentation criterion and, hence, the criterion for determining the segmented object, only at certain places in this object. Thus, the legibility of the displayed images is improved.

9 Claims, 4 Drawing Sheets

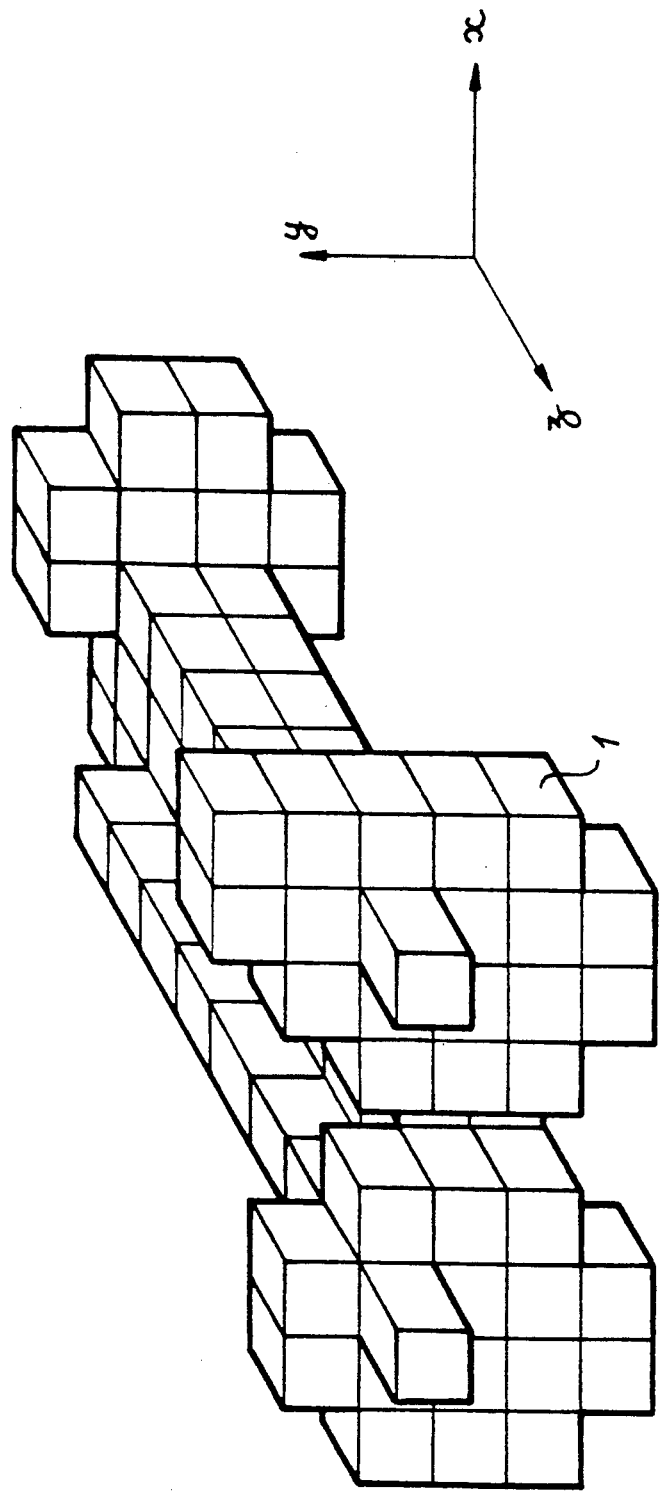
FIG_1

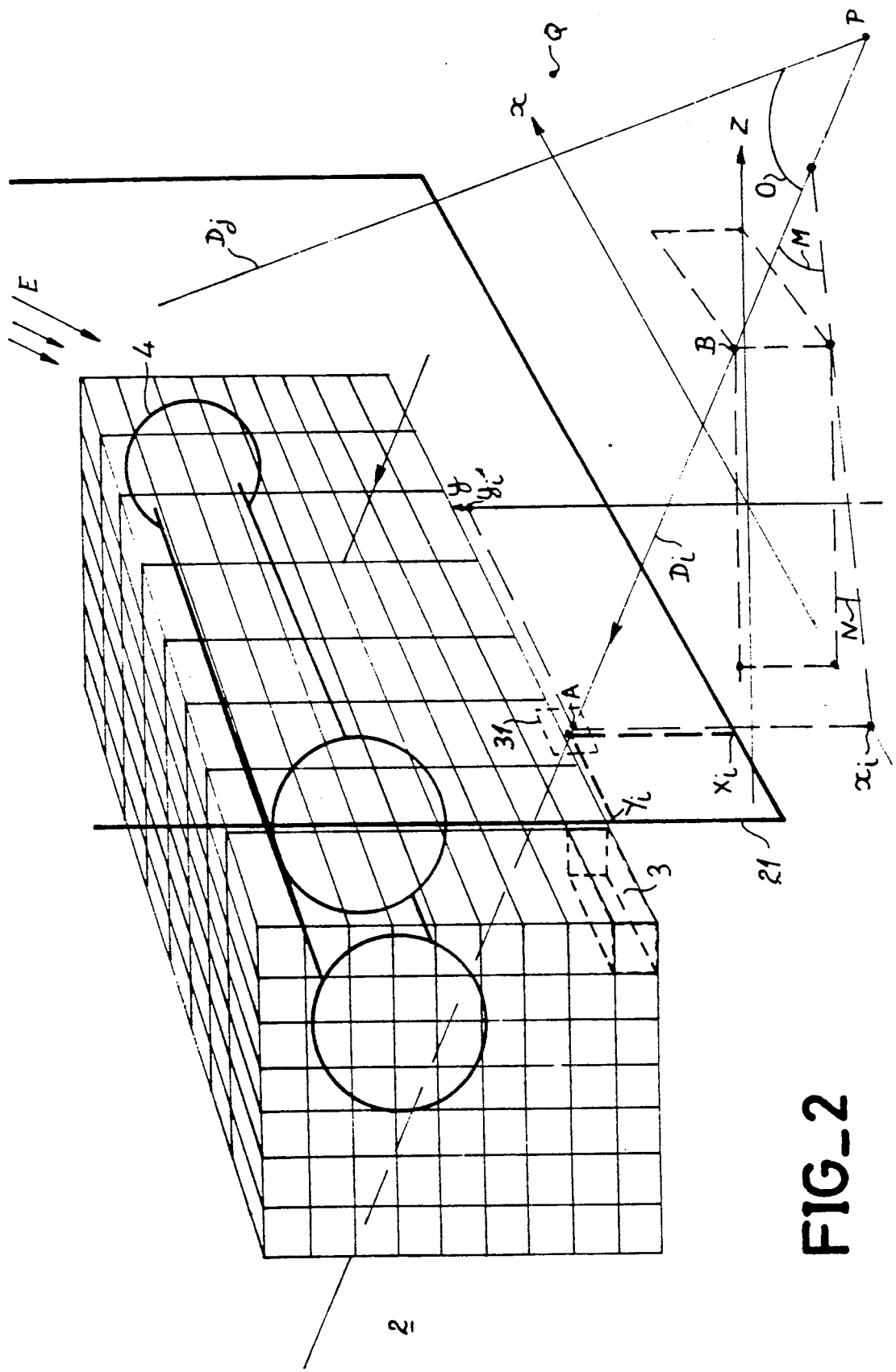
FIG_2

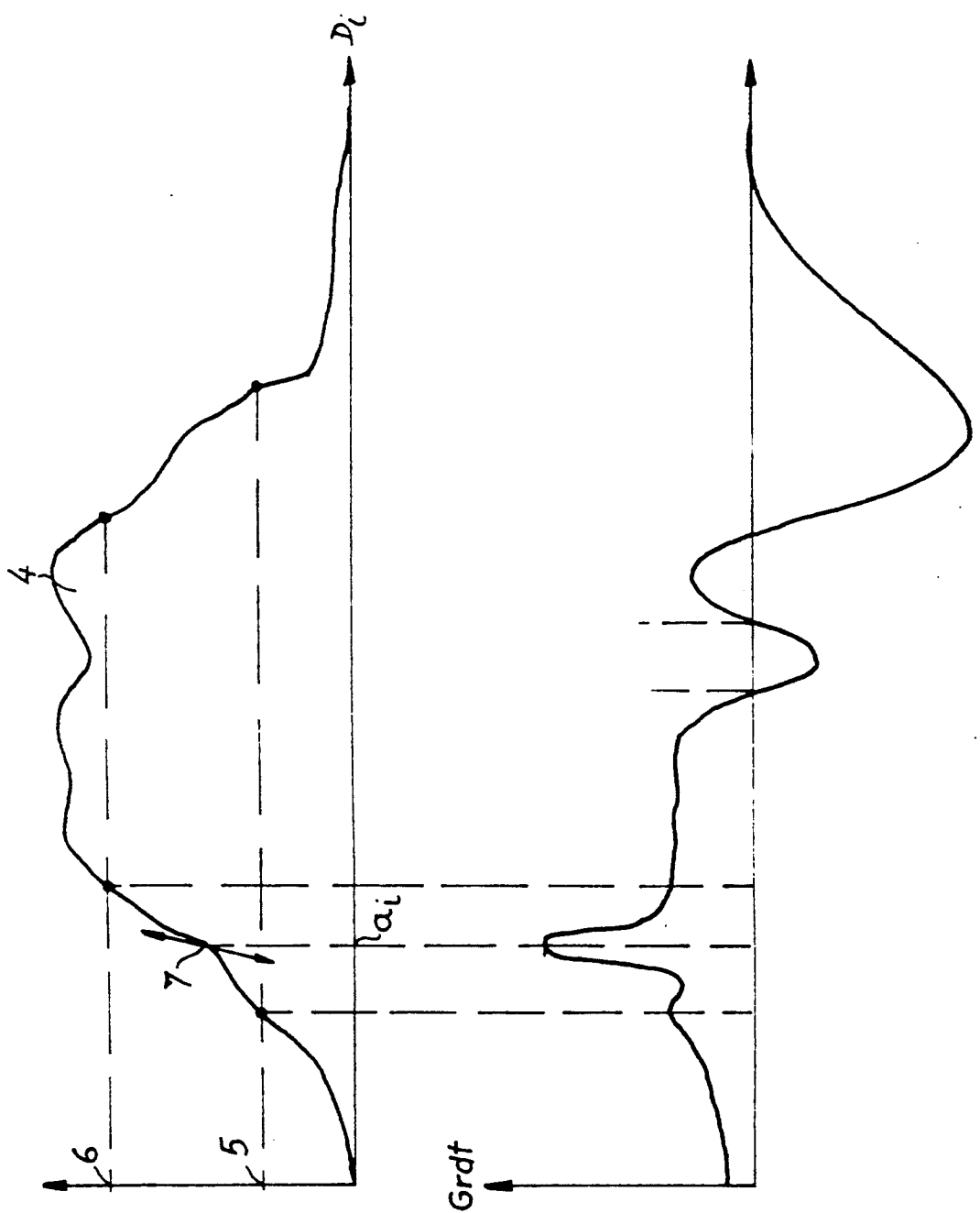
FIG_3a
FIG_3b

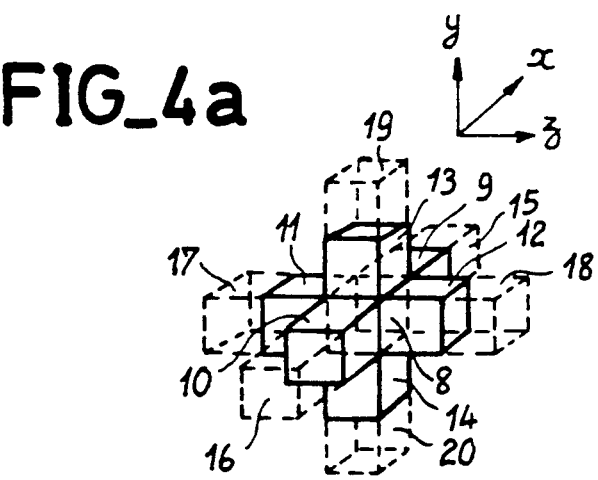
FIG_4a
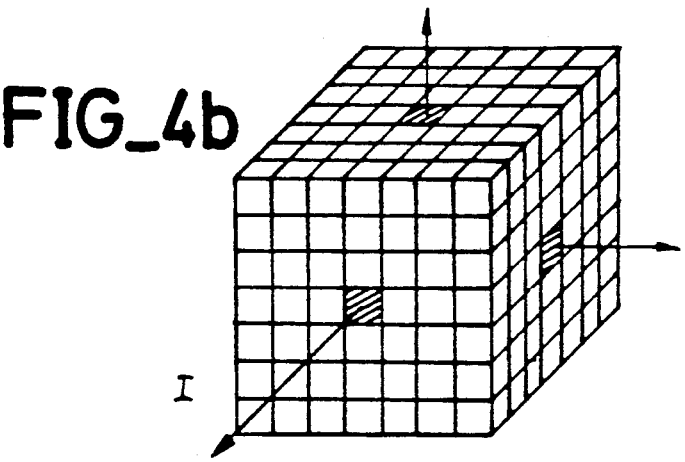
FIG_4b
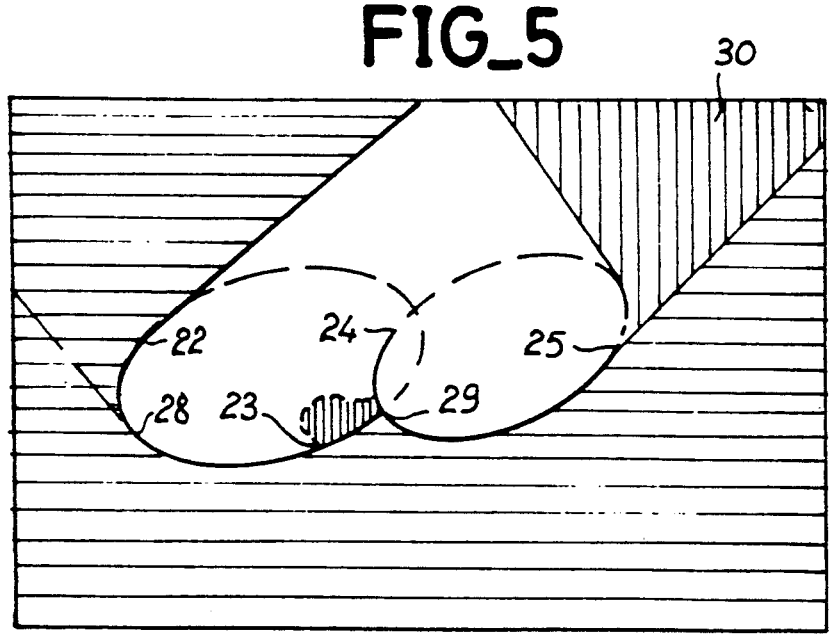
FIG_5

METHOD FOR THE COMPUTING AND IMAGING OF VIEWS OF AN OBJECT

This application is a continuation of application Ser. No. 07/177,458 filed on Apr. 1, 1988, now abandoned.

BACKGROUND OF THE INVENTION

1. Field of the Invention

The present invention is the result of collaboration with the "Laboratoire Image" of the "Ecole Nationale Superieure des Telecommunications". Its relates to a method for the computing and imaging of views of an object. It can be applied in a variety of fields where displays are required. In particular, it can be applied in medicine where, for diagnostic reasons, practitioners have to know the internal tissue structures of the bodies of patients being examined. The invention shall be described in this context without, however, any implication whatsoever that it is restricted to this context.

2. Description of the Prior Art

There are known methods in medicine for investigating the interior of the human body with a view to depicting its internal tissue structure. These known methods include X-ray tomodensitometry, nuclear magnetic resonance imaging, gammaradiography and echography. In all these techniques, and especially in the first one, there are known ways for depicting images of sections, along determined section planes, of the body examined. For a clearer understanding of this question, it might be recalled that an X-ray tomodensitometer has an X-ray generator which emits a flat (thin) beam of X-rays towards a multi-detector which is held facing this generator. A body to be examined is placed, with its longitudinal dimension arranged transversally with respect to the radiation plane, between this generator and this multi-detector. Then, the generator/multi-detector set is rotated around the body with a section of the body being subjected to successive doses of irradiation at several angles of incidence. At each irradiation, the detected signal is measured by the multi-detector. With the series of measurements corresponding to the several angles of incidence involved, an image of this section can be reconstructed according to known methods for reconstructing images. To obtain knowledge of the architecture of internal tissue structures, a third dimension must be explored. In practice, the body is shifted longitudinally with respect to the generator/multi-detector set, and the operation is started again for a section that neighbours the previous one. This procedure is continued until the collection of images, stacked on one another, is itself sufficient to enable the depiction of sections of the body in a variety of sectional directions. For the acquisition mode described can be used for the immediate depiction of cross-sections (roughly perpendicular to the patient's vertebral column). Then, image lines can be taken out of each image of the successive sections and can be recombined to create frontal sections (parallel to the patient's back) or again, sagittal sections (perpendicular to the patient's back). It is even possible to depict oblique sections through the judicious choice of image lines from each of the successive images.

It can be shown that this type of depiction is also possible with all the other three methods referred to. To conduct this type of operation efficiently, it is enough to have a set of data representing a physical phenonenon, namely radiological density, susceptibility to nuclear resonance, vascularization rate or the reflective power of ultrasonic waves, and for this data to be assigned to coordinates of regions in the space thus subjected to examination. All this data is defined by the term "digital volume". The word "volume" refers to the spatial distribution of regions or volume elements in the body under examination (these volume elements have three-dimensional coordinates x, y and z). The word "digital" refers to the physical data itself: in tomodensitometry, for example, it refers to the signal measured by the multi-detector. In the rest of this description, it shall be assumed that the spatial resolution of the digital volume is the same along all three directions in which the space concerned is explored. However, this is not a necessary condition for the invention. Furthermore, it is easy, in any case, to meet this condition by interpolating the physical data on neighbouring volume elements in the volume under examination.

The images thus shown have, however, the disadvantage of being sectional images. Sections impose constraints because their reading requires a priori interpretation by the reader. This means that the significance of a section is seen by the reader purely as a verification of his prior conclusions on this section. In addition to the fact that interpreting ability requires a great deal of experience, there are branches of science (especially nuclear magnetic resonance) where, since the investigative method used is a new one, the end image to be obtained is not always known, and it is even less easy to know how to interpret this image. Thus, there emerged the idea of showing views of objects rather than sections. It was thus felt that internal structures could be shown as they would be seen if the bodies examined had been dissected. The interpreting ability and competence needed to interpret a view are far less than would be the case for a section. This would result in a greatly improved understanding of the behaviour of the structures shown in the sections. The specialist is no longer required to reconstruct this behaviour in his mind.

In theory, the depiction of views of objects has already been studied. It comprises two main operations: firstly, a segmentation and secondly, the display itself. Taking a given and known digital volume, the segmentation uses the principle according to which an object (a structure within this digital volume) is determined by all the locations of the volume elements of this volume where the physical data measured has given characteristics. To simplify this point, in tomodensitometry, it might be broadly assumed that bones, for example, are differentiated from the other tissues by greater radiological density. It then becomes possible to distinguish all the volume elements, in the digital volume, for which the measured radiological density is above a certain threshold. More particularly, an object may be defined by a value of its physical data belonging to a range of values located on either side of a nominal value.

The images of the cross sections are generally prepared by computers and the contents of these images may be stored in the memories of these computers. These memories may be organized in memory sections representing each of the images, logically associated with one another to constitute a memory volume corresponding to the digital volume being examined. By means of a test, it is easy to determine those addresses of the memory cells, representating the digital volume elements (and hence representing a specific object in the volume examined in the body), in which the magnitude of the physical data stored comes within the range in question. The segmentation, namely the determination of the virtual image of the object to be depicted, is ended at this stage.

The display is then done according to techniques using the science of illumination. These techniques are applied to the segmented object for which the volume is known and for which the geometrical shape, i.e. the surface, can be known. Initially, the surface of this object is grasped, for example by means of many facets interconnecting the volume elements located on the boundary of the segmented object. Then these facets are assigned a luminosity level. This luminosity represents an illumination which they are capable of receiving and restoring according to their orientation. Finally, in the image of the view, surface elements of the image are devoted to the volume elements that are visible (from a given viewpoint), and these surface elements are assigned a luminosity level corresponding to that of the facets of the visible volume elements. As an indication, FIG. 1 gives a schematic view of a segmented volume of this type. By taking advantage of the 3-D (along three orthogonal spatial axes) matrix organization of the segmented object, the facets, such as 1, of the cubic volume elements of the segmented volume can be directly used as illuminated surfaces reflecting an illuminating light. This method which intuitively has great simplicity as regards the processing of the illumination signal because of the small number of illuminated surfaces that can be envisaged has, nonetheless, one disadvantage: it can only give views of an artificial contour, different from the real contour, because the perpendiculars to the facets are estimated in relation to the three cartesian axes describing this object (x, y, z). Other more efficient displaying techniques can be contemplated: they are all based on the same principle. The definition of the facets in these techniques is only more precise because the possibilities they give for orienting the facets are not limited and the views of the objects imaged are less crude. However, they also take longer to compute.

Various methods have been used to simplify the computation of images. For example, a method called "octree encoding" has been invented by D. J. Meagher and is disclosed in an article "Efficient Synthetic Image Generation of Arbitrary 3-D Objects" in IEEE Computer Society Conference on Pattern Recognition and Image Processing, June 1982. This method introduces a new presentation of segmentation. In it, each volume element is considered to be part of a group of eight volume elements adjacent to it. Each group is considered to be part of a set of eight groups adjacent to this group, and so on until the digital volume to be examined is completely defined. The elements in the groups, the groups in the sets, etc. are then assigned a binary value depending on whether or not they belong to the segmented object. This data structure has the advantage of providing for the simple creation of a number of algorithms, especially display algorithms, by using orders of priority with respect to the data. All the depiction methods referred to have one disadvantage: they assume that the contour presented is a true and sharply defined contour. However, real physical data, especially in medicine, is noise-infested. This noise, which may be due to measurement or processing, is sometimes loud enough to exclude certain volume elements from the segmented body when they actually belong to it. The result of this is that, if the place where this exclusion occurs is on the surface of the segmented object (the surface that it is desired to depict), the facets at this position get disoriented because of the hole created by the exclusion. And in the total image displayed, certain parts may appear clearly while the significance of other parts may be less clear. It is then impossible to process the image locally in order to improve or modify the characteristics of the segmentation or depiction of this image at the place where it is unclear. For any modification of the segmentation criteria (a modification or shift in the value of the range used) or of the display criteria (the definition of the facets) has repercussions on the totality of the displayed image. An improvement in one part of the image may then become a disturbance in another part. Such and such a part which has been clearly demarcated in a preceding image becomes imprecise in the new image after the criteria have been modified.

An object of the present invention is to remove these present disadvantages by assigning a parameter to each of the volume elements distinguished during the segmentation process. This parameter depends on the mode of exploration of the digital volume, and this parameter and mode of exploration are such that a different parameter is assigned to each of the different volume elements of the surface of the segmented object. In the present state of the art, the segmentation is done as follows: the memory cells of the memory are addressed, one after the other other, to a comparator which sorts them out according to a segmentation criterion. The mode in which the computer memory is addressed is then a mode that depends on the architectural technology of this computer. For example, the memory is addressed cell by cell in a memory line, line by line in a memory section, and section after section in the memory. In the invention, the memory addressing mode or (in what amounts to the same thing) the mode of exploration of the corresponding digital volume, is not laid down by the technology of the computer. On the contrary, it depends on a specific process. This specific process is related, in particular, to the location of the viewpoint from which the object is supposed to be displayed. Thus, each distinguished volume element is provided with a parameter, depending on a stage in the exploration mode at the end of which the volume element thus distinguished has been chosen. This parameter can then be used to modify the segmentation or depiction criteria locally.

SUMMARY OF THE INVENTION

The invention thus relates to a method for the computing and imaging of views of an object, said object being determined, within a digital volume, by a set of volume elements each loaded with at least one physical datum, the value of which represents this object, method wherein:

the digital volume is segmented by the digital processing of the values of the physical data relating to the volume elements to distinguish all the volume elements of this object, and wherein an image of a view of this segmented object is displayed from a given viewpoint, and wherein the segmentation is done by assigning each element of the segmented volume a parameter that represents a mode of exploration of the digital volume.

BRIEF DESCRIPTION OF THE DRAWINGS

The invention will be better understood from the following description and the appended drawings.

These figures are given solely by way of indication and in no way restrict the scope of the invention. Of these figures:

FIG. 1 shows a schematic view of a segmented volume according to the prior art referred to;

FIG. 2 shows a digital volume and a special mode of exploration of this digital volume corresponding to a particular mode of observation of this volume;

FIGS. 3a and 3b show a schematic view of a preferred criterion of segmentation;

FIGS. 4a and 4b show different possible physical meanings for retained criterions of segmentation;

FIG. 5 shows the effect, in the method of the invention, of the viewpoint from which the segmented object is displayed.

DESCRIPTION OF A PREFERRED EMBODIMENT

FIG. 1 gives a perspective view of the virtual shape of an object segmented according to prior art methods. We may assume that it schematically represents a bone with its apophysis. FIG. 2 shows a digital volume 2 containing a set of volume elements such as 3. Some of these volume elements, marked out by an imprecise contour 4, are loaded with a physical datum, the value of which represents the fact that they belong to a particular object, such as the bone of FIG. 1 for example. For example, the value of the radiological densities of the volume elements circumscribed by the contour 4 may belong to a range of values chosen as a criterion for distinguishing the volume 4 (FIG. 3a). Using an object 4, segmented in this way, it is possible to proceed to the depiction of this object in a known way. A specific feature of the invention lies in the mode of exploration of the digital volume. For, rather than considering the volume elements or again, the corresponding memory cells, in a sequential way organized along the three reference axes of this volume or this memory, it is possible, on the contrary, to explore this volume or this memory by examining the sequence of volume elements or memory cells located along a straight line $D_i$. The computation of the equation of a straight line $D_i$ with respect to a reference x,y,z, related to the digital volume, is known. It is therefore possible to obtain access successively to the volume elements which, for example towards the left-hand side in the drawing of the straight line, are intersected by this straight line. With a computer used to explore the digital volume, the equation of the straight line $D_i$ should be replaced by a computation of addresses of the corresponding memory cells. Each address of memory cells belonging to the "straight line" is connected to the addresses of the other memory cells, also belonging to this "straight line", by a known type of correlating relationship. Examples of such correlations are described in "Synthèse d'Images: Algorithmes Elémentaires" (Image Synthesis: Elementary Algorithms) by G. Hegron in Dunod Informatique, Paris, 1985. Another description of correlations of this type can be found in J. E. Brehesenham, "Algorithm for Computer Control of a Digital Plotter" in IBM System Journal, Vol. 4, No. 1, 1965, pages 25 to 30. The idea behind this latter algorithm is as follows: instead of computing, with multiplications, the coordinates of each point P+k.U along the straight line passing through the point P and along the directing vector U, an incremental computation is done using only whole number additions. This amounts to determining a following volume element from an already-intersected volume element. The value of these algorithms is that they only require integer arithmetic.

In the sequence of memory cells thus addressed or (which amounts to the same thing) in the corresponding volume elements, it is possible to distinguish the physical magnitude contained by way of information. It is possible, for example, to choose, as the significant memory cell, that memory cell which corresponds to the first volume element for which the distinguishing criterion is met. For this volume element, we then have, firstly, its address in the memory (which is equivalent to its geographical position in the digital volume) and, secondly, the directing parameters of the straight line $D_i$ which was used to determine this volume element. In a 3-D space, a straight line is determined at two points, A and B, by six coordinates, namely three coordinates for each point. The parameter thus assigned to the distinguished volume element may then be a 6-D parameter.

In a simplified version of the invention, all the straight lines $D_i$ for the exploration of the digital volume are parallel with one another. This means that their directing angles M and N are the same for all. Each straight line may then be parametrized simply by the coordinates $x_i, y_i$ of its meeting point A with a reference plane x y. As shall be seen further below, each point of the image to be displayed (each volume element chosen) may then be assigned only one 2-D parameter $(x_i, y_i)$ while the displayed image, for its part, may be assigned two other dimensions of the parameter (M, N), depending on the mode of observation of the displayed image. We shall see further below that this type of exploration of the digital volume leads to the depiction of axonometrical images, i.e. images in false perspective. To obtain a perspective effect, it may be necessary to produce straight lines $D_j$ that converge at any point Q. For a depiction of this type, it can be shown that the point Q should be located at the position P where the viewpoint of the depicted image is supposed to be located. In this case, the straight lines D converge at the point Q in a solid angle O. In this more general version, the angles M, N and O parametrize the view while the coordinates $x_i, y_i$ parametrize each volume element more specifically. It can also be said, however, that the parameters M, N and O too parametrize the volume elements in question. FIGS. 3a and 3b show a preferred way of segmenting the object 4. For each of the straight lines $D_i$, the data contained in the volume elements may be presented sequentially to a comparator which determines the addresses for which the value of this data is contained within a range of values 5–6. The result of this determining operation may lead to the consideration that, before the address $a_i$, we are not in the segmented object, but that it is penetrated afterwards. The exact determining of the address $a_i$ may be made difficult by the noisiness of the physical data signal in the vicinity of the transition between the object 4 and that which is external to it, as well as by the shape (of variable sharpness) of this transition itself. It is thus felt that by computing the gradient of the physical magnitude loaded in each volume element, belonging to the straight line $D_i$ and to the range, and by choosing only that volume element which has the maximum gradient (at the inflexion point 7) the position or the address $a_i$ of the concerned volume (FIG. 3b) is determined with greater precision. In general, if the range 5–6 is fine enough, the number of possible addresses for $a_i$ is small. If this number of addresses is greater than a given number, for example if the higher value 6 is never even encountered or if it is encountered only at a great distance along the straight line D, the number of volume elements tested may be limited to about 20. Here again a search is made for the address of the volume element for which the data gradient is the maximum. It may also happen that the noise is great in the stored data and that the gradient remains always small. In this case, the first volume element address encountered, loaded with a physical datum contained in the range 5-6, may be chosen arbitrarily as the volume element address. The gradient at each volume element may be computed quite simply. FIGS. 4a and 4b give examples of the computation of these gradients. Take a volume element 8 being assessed because it belongs to a straight line $D_i$ for the exploration of the volume and because of the value of its physical data. For this volume 8, we know its direct neighbours, 9 to 14, which are aligned along the axes X, Y, Z defining the digital volume. It is possible to calculate the gradient from these neighbours: for example, the sum of the absolute values of the differences of the physical data loaded in the volume elements, respectively located on either side of the volume elements 8, on each of the axes of the reference system. A computation is made of the absolute value of the difference of the physical data values loaded in the volume elements, respectively 9 and 10, 11 and 12 and 13 and 14. The volume element of the series of volume elements belonging to the straight line $D_i$, for which this sum is the highest, may be the chosen volume element, i.e. it may be considered to belong to the surface of the object 4 at the intersection of the straight line $D_i$ with this object 4. Preferably these gradients are computed according to a method of the type invented by S. W. Zucker ("A Three-Dimensional Edge Operator", IEEE PAMI, Vol. PAMI-3, No. 3, May 1981, pp. 324-321) or by D. G. Morgenthaler ("Multidimensional Edge Detection by Hypersurface Fitting", IEEE PAMI, Vol. PAMI-3, No. 4, July 1981, pp. 482-486).

However, it might be worthwhile to modify the segmentation criterion. For example, instead of taking the six volume elements that are directly in the vicinity of a considered volume element, the computation may be started again for a greater neighbourhood. For example, the volume elements 15 to 20 (shown with dashes) around the volume element 8 may also be considered. For any gradient-measuring operation is like a difference or a differentiating operation. By making the continuous component of the data disappear, this differentation makes the result very sensitive to noise. It may therefore be advisable to choose, in addition, volume elements that are at a distance (15 to 20) or even to choose a weighting of certain neighbouring volume elements (9 to 20). FIG. 4b even suggests that, to compute the gradient, all the data of a number T of volume elements neighbouring the tested volume element may be assessed.

It can thus be seen that, in going from the computation of the simple exceeding of a threshold to a gradient computation as complex as this one, the time during which a computer is occupied in processing operations goes on increasing. A digital volume discriminating protocol may then be defined. For example, as long as the address of a first volume element, which may belong to the object 4, has not been distinguished, only a simple operation for comparison with a threshold (5 or 6) is done. As soon as the address of a volume element of this type is distinguished, an attempt may be made to compute the gradient with the six immediate neighbours. If this computation is not sufficiently effective, we may consider a computation of the six neighbouring elements that are further away, or even a computation of a greater neighbourhood, determined according to the local context (for example, very sharp contours or smooth transitions, etc.). If necessary, it is even possible to make a more comprehensive composition including T neighbouring volume elements. In this case, "T" may even represent the gradient computation algorithm itself.

However valuable this automatic change in the segmentation criterion may be, it has one disadvantage: it is transparent to the observer of the displayed image. This observer does not definitely know which is the exact criterion that has prevailed for each region in the displayed image. The image may be clear throughout, but it may not correspond in a sure way to one end and the same definition at each place. Here, it may be preferred to restrict the protocol to only one automatic change: the measurement of an exceeding of the threshold initially, and computation of gradient as soon as an address of a volume element, which might belong to the object 4, has been distinguished. However, the possibility is retained of associating a modification of the distinguishing criterion with certain parts of the image. For, after an initial display, acquired under normal conditions, it is possible to note those parts of this image for which the contours are correctly determined and the other parts for which the contours are not correctly determined. On a display screen 21 (FIG. 2), it is possible to distinguish those regions $X_i$ and $Y_i$ for which the display is unclear. Here, the screen 21 of a display device (not shown) is placed fictitiously between the viewpoint and the virtual structure to be imaged. The coordinates $Y_i$ and $X_i$ of the locations, on this screen, of an image fault are immediately correlated with the parameters $x_i$ and $y_i$ of the straight lines $D_i$ which have resulted in the concerned volume elements. Thus, it is easy to re-distinguish the volume elements, which are located on all the neighbouring straight lines $D_i$ and correspond to these incorrectly determined locations, by modifying the distinguishing criterion. In other words, the segmentation is done again but with a modified criterion for all the straight lines $D_i$ concerned, namely for all the volume elements parametrized by the coefficient of these straight lines. In the end, another general dimension is thus added to the parameter in this invention: this dimension relates to the characteristics of the criterion for distinguishing the segmented object. By its nature, this dimension also represents the mode of exploration of the digital volume. It might be noted here that, in the prior art described, any segmented object is defined according to a unchanging cell-line-section exploration mode and according to a common segmentation criterion. It is impossible, in the prior art described, to modify the distinguishing conditions locally since, in the displayed image, the position in the space x, y, z or the exact address in the machine to which the volume elements belong is not known.

The method of the invention may thus have a disadvantage owing to the access mode specific to the addresses of the different volume elements to be assessed which belong to the straight lines $D_i$. For this address mode is not as simple as a natural sequential address mode which could be had with a reading of the cell-line-section memory. This disadvantage is minimal and, on the contrary, the method of the invention can be used to gain time as soon as it is decided to "rotate" the displayed object before an observer looking at the display screen 21. Furthermore, only the useful parts of the digital volume are manipulated during the segmentation since the process of going through the volumes is stopped as soon as a satisfactory intersection point is found. Thus, there is a gain in computing time. To simplify this point, if we take an axonometrical display, the fact of making the object rotate is equivalent to shifting the viewpoint P with respect to the digital volume 2. In this representation in false perspective, the point P is at infinity and, consequently, the field angle 0, in which the object 4 is contained, is zero. During this shift, the only change is in the directing angles N and M, which are common to all the straight lines $D_i$.

In FIG. 5, where the visible contour of the object 4 has been limited to parts 22-23 and 24-25, contained in a section plane, the entire part that is hachured horizontally, corresponding to a first viewing direction 26, has already been tested in the digital volume and has given data according to which this hachured part contains no parts of the segmented volume. During a second display, in which the viewpoint is shifted along 27, a large part of the contour 28-23 and 29-25 is already known. The only regions that can be left to be explored in the digital volume are firstly, marginal regions (to the right of 23 and 25) of the segmented object and, secondly, regions that are outside (30) this segmented object. In doing this exploration, it is seen that the viewpoint of the display creates interference, in the invention, like a parameter for the determination of the segmented object. Thus, the segmentation of the digital volume can be limited to that part which is projected in one region or another of the screen (i.e. it is possible to limit the segmentation to a generalized cylinder). But it is also possible to limit the segmentation to a subset defined totally with respect to the object space. For example, if the approximate position of the object is known a priori, the segmentation can be limited to a sphere or to a parallelepiped encompassing this object. In the prior art referred to, the object is segmented once and for all, and the display viewpoint depends solely on operations for representing the segmented object. In practical terms, the parts common to the displays oriented in 26 and 27 simply have their parameters $x_i$ $y_i$ modified, from one display to the other, according to an algorithm. This algorithm is easy to calculate since we know the locations of the segmented volume elements under consideration and the equations of the straight lines $D_i$ and $D'_i$, which can be used to reach them from one viewpoint to the other.

The display of the image itself is advantageously simplified by the method of the invention. For the theory of illumination has laws, particularly a model known as Lambert's model. This theory is described, in particular, in J. D. Foley and A. Van Dam, "Fundamentals of Interactive Computer Graphics", Addison-Wesley, 1982. According to this theory, light coming from a region of space may have three reflected components: a so-called ambient light, a diffused light and a specularly reflected light. The ambient light emitted by a facet does not depend on the orientation of this facet. In an image, this component acts somewhat like a continuous component of luminosity of the entire image. The light diffused by a facet is a light emitted identically in all directions by this facet. Its intensity, in all these directions, depends on the angle of incidence of the light that has illuminated the facet. The specularly reflected light is governed roughly by a mirror type principle of reflection. In simple terms, an illuminating light ray is not reflected in a single ray, but rather in a cone, with an angular spread that depends on the specular nature of the material comprising the facet. For the latter two components, it is therefore necessary to know the orientation of the facets of the segmented object in order to achieve imaging of views of objects.

The methods used in the prior art referred to, working from the segmented volume, lead to determining a series of visible facets for which the luminosity is computed with a view to display, and for which it is therefore necessary to know the perpendiculars to these facets. Hence, there are two types of computations to be done: the distinguishing of the visible parts of the segmented object, and then the computation of the luminous contributions of the facets associated with these parts (this computation of the contributions comprises the computation of the perpendiculars). It can be realized that the technique of the invention, which uses the gradient computation, can be used to obtain these perpendiculars directly. For, by definition, at a point of an equipotential surface, the gradient is the perpendicular to this surface. And this gradient is known with its three components with respect to the axes x y z. This means that an elementary facet surface, perpendicular to this gradient, can be associated with this gradient. Thus, it is enough to assign each volume element of the surface of the segmented volume an elementary facet for which, finally, no particular shape (triangular, square, etc.) is sought, but for which attention is paid only to the perpendicular. With this perpendicular, we directly obtain the data needed to compute the luminosity of this assigned elementary facet. Thus, knowing an illumination direction E (FIG. 2) and knowing the perpendicular for each volume element of the surface of the segmented volume, it is possible to assess the luminosity of each elementary facet visible from a viewpoint P. In the image shown, each surface element 31 of this image, with coordinates $X_i$ and $Y_i$, is assigned the computed luminosity of the facet corresponding to the segmented volume element which has been distinguished on the straight line $D_i$ parametrized by $x_i$ and $y_i$, $x_i$ and $y_i$ being correlated with $X_i$ and $Y_i$.

Another advantage of the invention is that it gives direct access to the volume elements of the surface of the segmented volume. For (FIG. 3a) if we consider that a volume element belongs to the object 4 as soon as the value of its physical data is above a threshold 5 (discounting the value 6), we get all the volume elements belonging to the object 4: the surface of this object 4 is not obtained. The subsequent computation of this surface must therefore be done by eliminating the volume elements contained in the object. With the method of the invention, where the exploration mode is a directed mode, access is had directly to the first encountered and significant volume elements, i.e. precisely those that are on the surface of the object 4. Finally, the parameter that characterizes the mode of exploration of the digital volume may also correspond to something else. For it is necessary to eliminate the small traces of noise that block the passage of the exploring rays. It might be sought to work on the basis of the perimeter of these traces. That is, an attempt might be made to find out which neighbouring volume elements have the same characteristics as a distinguished volume element. Moving from one volume element to the next, it is possible either to return swiftly to the starting point, turning around the noise trace, or to move away from the distinguished volume element. In the former case, we are in the presence of a noise, and the exploration must be continued on the other side of the trace. In the latter case, the surface of the segmented object is reached. Thus, spatial coherence is given to this object in a simple way.

What is claimed is:

1. A method for creating and displaying views of an object, said object being determined, within a digital volume, by a set of volume elements, each volume element being loaded with at least one physical datum, a value of which represents a nature of said object, said method comprising the steps of:

segmenting the digital volume by digital selecting, of volume elements which are found aligned with rays casted from an arbitrary point in space, said selected volume elements being the first volume elements met by said casted ray when going over said casted rays from a first end of each of said casted rays to a second end of each of said casted rays, and having a physical datum as part of said volume elements complying with a given criterion;

wherein said step of segmenting further comprises the step of assigning each of said segmented volume elements a parameter representing one of said casted rays reaching this volume element; and displaying an image of a view, from a given viewpoint, of said segmented object.

2. A method according to claim 1, whereby the selecting is conducted according to an observation mode, said casted rays starting from a given viewpoint, said given viewpoint being at the apex of an angle of observation of said observation mode, wherein an assignment of a parameter to each volume element represents coordinates of one of said casted rays, said one of said casted rays starting from said given viewpoint and reaching each of said volume elements.

3. A method according to claim 2 wherein the value of the observation angle is zero, the observation point being at the at infinity, to give an axonometrical representation of the segmented object.

4. A method according to claim 2 wherein the parameter of each element represents the coordinates of the intersection, with a reference plane, of said casted ray that reaches said element.

5. A method according to claims 1, 2, 3 or 4, wherein a segmentation criterion comprises:

a determination of a range of values of physical data and the selection of volume elements which, in one step of the mode of exploration of the digital volume, are loaded with data, the value of which comes within this range.

6. A method according to claim 5 wherein a segmentation criterion further comprises:

a measurement of a physical data gradient of the elements for which the values are located within the range, and a choice of the element for which this gradient is at its highest.

7. A method according to claim 6 wherein the representation comprises:

a determination of perpendiculars to a surface of the segmented volume, and wherein said perpendiculars are directions of said gradients at the position of the corresponding volume elements.

8. A method according to claim 6 wherein a computation of the gradient at each element comprises:

a taking into account of the elements that are closest to this element.

9. A method according to claim 6 wherein a computation of the gradient at each element comprises:

a taking into account of a given number of elements neighbouring the element considered and a choice of an algorithm to compute this gradient.

* * * * *